(12) United States Patent
Salit et al.

(10) Patent No.: US 10,030,116 B2
(45) Date of Patent: *Jul. 24, 2018

(54) RUBBER COMPOSITION COMPRISING A DIENE ELASTOMER BEARING IMIDAZOLE FUNCTIONAL GROUPS RANDOMLY DISTRIBUTED ALONG THE CHAIN

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Anne-Frédérique Salit, Clermont-Ferrand (FR); Nicolas Seeboth, Clermont-Ferrand (FR); Sophie Gander, Clermont-Ferrand (FR); Claire Rannoux, Clermont-Ferrand (FR); Anne-Lise Thuilliez, Clermont-Ferrand (FR)

(73) Assignee: COMPAGNIE GENERAL DES ETABLISSEMENTS MICHELIN, Clermont-Ferrand (FR)

( * ) Notice: Subject to any disclaimer, the term of this patent is extended or adjusted under 35 U.S.C. 154(b) by 19 days.

This patent is subject to a terminal disclaimer.

(21) Appl. No.: 15/031,510

(22) PCT Filed: Oct. 24, 2014

(86) PCT No.: PCT/EP2014/072840
§ 371 (c)(1),
(2) Date: Apr. 22, 2016

(87) PCT Pub. No.: WO2015/059271
PCT Pub. Date: Apr. 30, 2015

(65) Prior Publication Data
US 2016/0264753 A1    Sep. 15, 2016

(30) Foreign Application Priority Data

Oct. 25, 2013  (FR) .................................... 13 60414

(51) Int. Cl.
| | |
|---|---|
| C08L 9/00 | (2006.01) |
| C08K 3/36 | (2006.01) |
| C08C 19/22 | (2006.01) |
| B60C 1/00 | (2006.01) |
| C08K 3/04 | (2006.01) |
| C08L 7/00 | (2006.01) |
| C08L 9/06 | (2006.01) |
| C08L 15/00 | (2006.01) |
| C08L 91/06 | (2006.01) |
| C08K 3/013 | (2018.01) |

(52) U.S. Cl.
CPC .............. *C08K 3/36* (2013.01); *B60C 1/0016* (2013.01); *C08C 19/22* (2013.01); *C08K 3/013* (2018.01); *C08K 3/04* (2013.01); *C08L 7/00* (2013.01); *C08L 9/06* (2013.01); *C08L 15/00* (2013.01); *C08L 91/06* (2013.01)

(58) Field of Classification Search
CPC ..................................... C08K 3/36; C08K 3/04
USPC ......................................................... 524/572
See application file for complete search history.

(56) References Cited

U.S. PATENT DOCUMENTS

| | | | |
|---|---|---|---|
| 4,803,282 A | 2/1989 | St. Georgiev et al. ....... 548/336 |
| 5,140,055 A | 8/1992 | Hirata et al. ..................... 524/93 |
| 5,185,324 A | 2/1993 | Ruger et al. .................... 514/18 |
| 5,346,962 A * | 9/1994 | Hergenrother ....... C08F 290/048 |
| | | | 525/244 |
| 5,717,022 A | 2/1998 | Beckmann et al. |
| 6,034,250 A | 3/2000 | Goldstein et al. .......... 548/336.1 |
| 6,194,461 B1 | 2/2001 | Ikeda et al. .................... 514/579 |
| 6,774,255 B1 | 8/2004 | Tardivat et al. ............... 556/427 |
| 7,186,845 B2 | 3/2007 | Fukushima et al. .......... 548/257 |
| 7,199,175 B2 | 4/2007 | Vasseur ......................... 524/492 |
| 7,250,463 B2 | 7/2007 | Durel et al. ................... 524/492 |
| 7,300,970 B2 | 11/2007 | Durel et al. ................... 524/493 |
| 7,488,768 B2 | 2/2009 | Tardivat et al. .............. 524/262 |
| 7,491,767 B2 | 2/2009 | Durel et al. ................... 524/493 |
| 7,825,183 B2 | 11/2010 | Robert et al. ................. 524/476 |
| 7,834,074 B2 | 11/2010 | Brunelet et al. .............. 524/318 |
| 7,882,874 B2 | 2/2011 | Robert et al. .............. 152/209.1 |
| 7,900,667 B2 | 3/2011 | Vasseur ....................... 152/209.1 |
| 8,278,451 B2 | 10/2012 | Becker et al. ................. 546/112 |
| 8,324,310 B2 | 12/2012 | Robert et al. ................. 524/518 |
| 8,492,475 B2 | 7/2013 | Araujo Da Silva et al. . 524/552 |
| 9,010,393 B2 | 4/2015 | Araujo Da Silva et al. .......................... 524/575.5 |
| 9,394,434 B2 | 7/2016 | Araujo Da Silva et al. .......................... C08L 9/06 |
| 2003/0212185 A1 | 11/2003 | Vasseur ......................... 524/492 |

(Continued)

FOREIGN PATENT DOCUMENTS

| | | |
|---|---|---|
| CN | 101580558 A | 11/2009 |
| CN | 102985444 A | 3/2013 |

(Continued)

OTHER PUBLICATIONS

B. Cavalleri, et al., "Synthesis and Biological Activity of Some Vinyl-Substituted 2-Nitroimidazoles," J. Med. Chem., vol. 20, No. 5, pp. 656-660 (1977).

(Continued)

*Primary Examiner* — Hui Chin
(74) *Attorney, Agent, or Firm* — Fitzpatrick, Cella, Harper & Scinto

(57) ABSTRACT

A rubber composition comprises a reinforcing filler and a diene elastomer bearing imidazole functional groups along the chain which are randomly distributed along the chain. Such a composition exhibits an improved compromise in certain properties such as stiffness in the cured state and hysteresis.

29 Claims, No Drawings

(56) References Cited

U.S. PATENT DOCUMENTS

| | | | |
|---|---|---|---|
| 2004/0051210 A1 | 3/2004 | Tardivat et al. | 264/349 |
| 2005/0004297 A1 | 1/2005 | Durel et al. | 524/493 |
| 2005/0016650 A1 | 1/2005 | Durel et al. | 152/209.1 |
| 2005/0016651 A1 | 1/2005 | Durel et al. | 152/209.1 |
| 2007/0112120 A1 | 5/2007 | Vasseur | 524/492 |
| 2008/0009564 A1 | 1/2008 | Robert et al. | 523/351 |
| 2008/0156404 A1 | 7/2008 | Brunelet et al. | 152/209.1 |
| 2009/0186961 A1 | 7/2009 | Araujo Da Silva et al. | 523/150 |
| 2009/0209709 A1 | 8/2009 | Araujo Da Silva et al. | 525/333.1 |
| 2009/0234066 A1 | 9/2009 | Araujo Da Silva et al. | 524/571 |
| 2009/0286900 A1 | 11/2009 | Ichikawa et al. | 522/113 |
| 2009/0292063 A1 | 11/2009 | Robert et al. | 524/518 |
| 2010/0204359 A1 | 8/2010 | Robert et al. | 523/157 |
| 2011/0152458 A1 | 6/2011 | Araujo Da Silva et al. | 525/102 |
| 2012/0225233 A1 | 9/2012 | Guy et al. | 428/36.9 |
| 2012/0245270 A1 | 9/2012 | Blanchard et al. | 524/388 |
| 2013/0123418 A1 | 5/2013 | Araujo Da Silva et al. | 524/575 |
| 2013/0131279 A1 | 5/2013 | Araujo Da Silva et al. | 525/333.1 |
| 2013/0331475 A1 | 12/2013 | Ichikawa et al. | C08C 19/22 |
| 2015/0322234 A1 | 11/2015 | Fleury et al. | C08K 3/36 |
| 2016/0251456 A1 | 9/2016 | Ugolnikov et al. | C08F 8/30 |
| 2016/0263943 A1 | 9/2016 | Gander et al. | B60C 1/0016 |

FOREIGN PATENT DOCUMENTS

| | | |
|---|---|---|
| EP | 0 257 289 A2 | 3/1988 |
| EP | 0 257 391 A2 | 3/1988 |
| EP | 0 310 061 A1 | 4/1989 |
| EP | 0 373 549 A2 | 6/1990 |
| EP | 0 945 426 A1 | 9/1999 |
| EP | 0 967 207 A1 | 12/1999 |
| FR | 2 946 050 A1 | 12/2010 |
| JP | 2012-082265 A | 4/2012 |
| JP | 2013-087182 A | 5/2013 |
| WO | 96/37547 | 11/1996 |
| WO | 99/28380 | 6/1999 |
| WO | 02/10269 A2 | 2/2002 |
| WO | 02/30939 A1 | 4/2002 |
| WO | 02/31041 A1 | 4/2002 |
| WO | 03/002648 A1 | 1/2003 |
| WO | 03/002649 A1 | 1/2003 |
| WO | 03/016387 A1 | 2/2003 |
| WO | 2005/087859 A1 | 9/2005 |
| WO | 2006/045088 A1 | 4/2006 |
| WO | 2006/061064 A1 | 6/2006 |
| WO | 2006/125532 A1 | 11/2006 |
| WO | 2006/125533 A1 | 11/2006 |
| WO | 2006/125534 A1 | 11/2006 |
| WO | 2007/017060 A1 | 2/2007 |
| WO | 2008/002614 A2 | 1/2008 |
| WO | 2011/045131 A1 | 4/2011 |
| WO | 2012/007441 A1 | 1/2012 |
| WO | 2012/007442 A1 | 1/2012 |

OTHER PUBLICATIONS

Office Action dated Jan. 3, 2017, in counterpart CN application No. 201480058293.7 (8 pages including partial English translation).

S. Brunauer, et al., "Adsorption of Gases in Multimolecular Layers", J. Am. Chem. Soc., vol. 60, pp. 309-319 (1938).

I.G. Zenkevich, et al., "Identification of Alyklarene Chloromethylation Products Using Gas-Chromatographic Retention Indices", Russian Journal of General Chemistry, vol. 77, No. 4, pp. 611-619 (2007)(English translation of Zhurnal Obshchei Khimii, vol. 77, No. 4, pp. 653-662(2007)).

A. P. Yakubov, et al., "Synthesis of Sterically Hindered Aromatic Aldehydes", M. M., Bulletin of the Academy of Sciences of the USSR, Division of Chemical Science, vol. 40, No. 7.2, pp. 1427-1432 (1991)(English Translation of Izvestiya Akademii Nauk SSSR, Seriya Khimicheskaya, No. 7, pp. 1609-1615 (1991)).

\* cited by examiner

RUBBER COMPOSITION COMPRISING A DIENE ELASTOMER BEARING IMIDAZOLE FUNCTIONAL GROUPS RANDOMLY DISTRIBUTED ALONG THE CHAIN

FIELD OF THE INVENTION

The field of the present invention is that of diene rubber compositions reinforced by a filler which can be used in particular in the manufacture of tyres for vehicles. It relates more particularly to the treads of tyres having a low rolling resistance.

RELATED ART

Ideally, a tread should offer a tyre a very good level of road behaviour on a motor vehicle. This level of road behaviour can be contributed by the use, in the tread, of a rubber composition carefully chosen due to its rather high stiffness in the cured state. In order to increase the stiffness in the cured state of a rubber composition, it is known, for example, to increase the content of filler or to reduce the content of plasticizer in the rubber composition or also to introduce styrene and butadiene copolymers having a high styrene content into the rubber composition. However, some of these solutions generally have the disadvantage of increasing the hysteresis of the rubber composition.

Conversely, weakly hysteretic compositions generally exhibit a low stiffness in the cured state. It may prove to be necessary to overcome this fall in stiffness in the cured state in order to provide satisfactory road behaviour. For example, the Applicant Companies have described, in Patent Application WO 2011045131, a solution which makes it possible to increase the stiffness in the cured state of a weakly hysteretic rubber composition. This solution consists in introducing glycerol into the rubber composition.

The Applicant Companies, continuing their efforts to obtain a rubber composition which is stiff in the cured state and weakly hysteretic, have discovered that the use of a certain diene elastomer in a rubber composition reinforced by a filler makes it possible to achieve this aim.

BRIEF DESCRIPTION OF EMBODIMENTS OF THE INVENTION

A subject-matter of the present invention is a rubber composition based on at least one diene elastomer and a reinforcing filler, characterized in that the diene elastomer comprises imidazole rings corresponding to the formula (I) which are randomly distributed along the chain of the diene elastomer:

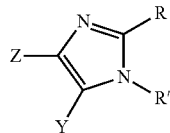

(I)

in which:
three of the four symbols Z, Y, R and R', which are identical or different, each represent an atom or a group of atoms, it being possible for Z and Y to form, together with the carbon atoms to which they are attached, a ring,
and the fourth symbol Z, Y, R or R' denotes a direct or indirect attachment to the diene elastomer.

Another subject-matter of the invention is a process for preparing a rubber composition based on at least one diene elastomer, a reinforcing filler and a crosslinking system, which diene elastomer comprises imidazole rings corresponding to the formula (I) as defined above which are randomly distributed along the chain of the diene elastomer.

Another subject-matter of the invention is a tread comprising the rubber composition in accordance with the invention.

A further subject-matter of the invention is a tyre comprising the rubber composition in accordance with the invention, in particular in its tread.

Another subject-matter of the invention is a diene elastomer comprising between 0 and 3 mol % of imidazole rings corresponding to the formula (I) as defined above and randomly distributed along the chain of the diene elastomer, the molar percentage being calculated on the basis of the combined monomer units of the elastomer. Such an elastomer makes it possible to obtain a rubber composition reinforced by a filler which exhibits a high stiffness in the cured state, without damaging the hysteresis properties of the rubber composition.

I. DETAILED DESCRIPTION OF THE INVENTION

In the present description, unless expressly indicated otherwise, all the percentages (%) shown are % by weight. The abbreviation "phr" means parts by weight per hundred parts of elastomer (of the total of the elastomers, if several elastomers are present).

Furthermore, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The expression "composition based on" should be understood as meaning, in the present description, a composition comprising the mixture and/or the in situ reaction product of the various constituents used, some of these base constituents (for example the elastomer, the filler or other additive conventionally used in a rubber composition intended for the manufacture of tyres) being capable of reacting or intended to react with one another, at least in part, during the various phases of manufacture of the composition intended for the manufacture of tyres.

An essential characteristic of the rubber composition according to the invention is that of comprising a diene elastomer which comprises imidazole rings corresponding to the formula (I) which are randomly distributed along the chain of the diene elastomer:

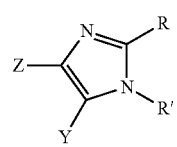

(I)

in which:
three of the four symbols Z, Y, R and R', which are identical or different, each represent an atom or a group of atoms, it being possible for Z and Y to form, together with the carbon atoms to which they are attached, a ring (of course, when neither Z nor Y denotes the $4^{th}$ symbol),
and just the fourth symbol denotes a direct or indirect attachment to the diene elastomer.

According to a first alternative form of the invention, R denotes a direct or indirect attachment to the elastomer, in which case R is the $4^{th}$ symbol.

According to this alternative form, R' can be a hydrogen atom or a carbon-based group which can contain at least one heteroatom.

According to a preferred embodiment of this alternative form, R' represents a carbon-based group containing from 1 to 20 carbon atoms, preferably an aliphatic group, more preferably an alkyl group which preferably contains from 1 to 12 carbon atoms.

According to a second alternative form of the invention, R' denotes a direct or indirect attachment to the elastomer, in which case R' is the $4^{th}$ symbol.

According to the first or the second alternative form, Z and Y can each be a hydrogen atom.

According to another embodiment of the first alternative form or of the second alternative form, Z and Y form, together with the carbon atoms to which they are attached, a ring.

The ring formed by Z, Y and the atoms to which Z and Y are attached may or may not be substituted and can comprise at least one heteroatom. Z and Y can form, with the two carbon atoms to which they are attached, an aromatic nucleus. In this case, the imidazole ring can be a substituted or unsubstituted benzimidazole.

According to a third alternative form of the invention, of course when Y and Z do not form, together with the carbon atoms to which they are attached, a ring, Y or Z denotes a direct or indirect attachment to the elastomer, in which case Y or Z is the $4^{th}$ symbol.

According to a specific embodiment of the second or of the third alternative form of the invention, R represents a hydrogen atom or a carbon-based group which can contain at least one heteroatom.

According to this specific embodiment of the second alternative form or of the third alternative form of the invention, R can be a group containing from 1 to 20 carbon atoms, preferably an aliphatic group, more preferably an alkyl group preferably containing from 1 to 12 carbon atoms. According to this specific embodiment of the invention, R is advantageously a methyl.

The diene elastomer in accordance with the invention must not be confused with the diene elastomers described in U.S. Pat. No. 5,346,962. This is because the elastomers of the prior art comprise imidazole rings which are present in the elastomer chain only in the polyvinylimidazole or polyvinylbenzimidazole block form and under no circumstances do they comprise imidazole rings randomly distributed along their chain.

Nevertheless, the diene elastomer can comprise, in addition to the imidazole rings randomly distributed along the chain, one or more polyvinylimidazole blocks, the imidazole being substituted or unsubstituted, or else one or more polyvinylbenzimidazole blocks, the benzimidazole being substituted or unsubstituted.

Advantageously, the diene elastomer is devoid of any polyvinylimidazole block, the imidazole being substituted or unsubstituted, or is devoid of any polyvinylbenzimidazole block, the benzimidazole being substituted or unsubstituted.

An elastomer typically has a weight-average molar mass of at least 80 000, preferably of at least 100 000. An elastomer is not to be confused with a liquid polymer, the weight-average molar mass of which is insufficient to confer elastic properties on the polymer chain. Liquid diene polymers are generally plasticizers.

A "diene" elastomer (or without distinction rubber) should be understood, in a known way, as meaning an (or several) elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". Generally, "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood to mean in particular a diene elastomer having a content of units of diene origin (conjugated dienes) which is greater than 50%.

Given these definitions, the term "diene elastomer capable of being used in the compositions in accordance with the invention" is understood more particularly to mean:
(a)—any homopolymer of a conjugated diene monomer, especially any homopolymer obtained by polymerization of a conjugated diene monomer having from 4 to 12 carbon atoms;
(b)—any copolymer obtained by copolymerization of one or more conjugated dienes with one another or with one or more vinylaromatic compounds having from 8 to 20 carbon atoms;
(c)—a ternary copolymer obtained by copolymerization of ethylene and an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d)—a copolymer of isobutene and isoprene (butyl rubber) and also the halogenated versions, in particular chlorinated or brominated versions, of this type of copolymer.

Although it applies to any type of diene elastomer, those skilled in the art of tyres will understand that the present invention is preferably employed with essentially unsaturated diene elastomers, in particular of the above type (a) or (b).

In the case of copolymers of the type (b), the latter comprise from 20% to 99% by weight of diene units and from 1% to 80% by weight of vinylaromatic units.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

Preferably, the diene elastomer is an essentially unsaturated elastomer selected from the group consisting of polybutadienes (BRs), polyisoprenes, butadiene copolymers, isoprene copolymers and the mixtures of these elastomers. Very particularly suitable as diene elastomer is a polybutadiene (BR), a copolymer of butadiene and styrene (SBR), a natural rubber (NR) or a synthetic polyisoprene (IR) preferably exhibiting a molar content of cis-1,4-bonds of greater than 90%.

The diene elastomers which bear imidazole rings of formula (Ia) along the chain of the diene elastomer, in which the symbol * denotes a direct or indirect attachment to the elastomer, can be synthesized by copolymerization, in particular by radical emulsion polymerization, of at least one diene and the vinylimidazole. For example, mention may be made of copolymers comprising diene units, in particular 1,3-butadiene units, and N-vinylimidazole units.

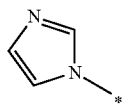

(Ia)

The diene elastomers which bear imidazole rings of formula (Ib) along the chain of the diene elastomer, in which the symbol * denotes a direct or indirect attachment to the elastomer and R is a group preferably containing from 1 to 20 carbon atoms, preferably an aliphatic group, more preferably an alkyl group preferably containing from 1 to 12 carbon atoms, more preferably still a methyl, can be synthesized by copolymerization, in particular by radical emulsion polymerization, of at least one diene and a vinylimidazole monomer, the imidazole ring being substituted in the 2 position. For example, mention may be made of copolymers comprising diene units, in particular 1,3-butadiene units, and N-vinyl-2-methylimidazole units.

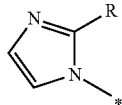

(Ib)

According to another specific embodiment of the invention, the imidazole rings, whether or not they are substituted, are groups grafted to the diene elastomer, preferably to the diene units of the diene elastomer. Preferably, the imidazole rings are grafted to the diene elastomer via groups resulting from the grafting of a 1,3-dipolar compound to the diene elastomer, which 1,3-dipolar compound corresponds to the formula (II):

Q-A-B    (II)

in which:
Q comprises a dipole containing at least and preferably one nitrogen atom,
A, which is preferably divalent, is an atom or a group of atoms connecting Q to B, B comprises the imidazole ring of formula (I) as defined above, in which the fourth symbol denoting an indirect attachment to the diene elastomer denotes a direct attachment to A.

The term "1,3-dipolar compound" is understood according to the definition given by the IUPAC.

The grafting of the 1,3-dipolar compound can be carried out in bulk, for example in an internal mixer or an external mixer, such as an open mill. The grafting is then carried out either at a temperature of the external mixer or of the internal mixture of less than 60° C., followed by a stage of a grafting reaction under a press or in an oven at temperatures ranging from 80° C. to 200° C., or at a temperature of the external mixer or of the internal mixer of greater than 60° C., without subsequent heat treatment. When the grafting is carried out in bulk, it is preferably carried out in the presence of an antioxidant.

The grafting process can also be carried out in solution, continuously or batchwise. The diene elastomer thus modified can be separated from its solution by any type of means known to a person skilled in the art and in particular by a steam stripping operation.

The 1,3-dipolar compounds selected from the group consisting of nitrile oxides, nitrile imines and nitrones, in which case Q contains a —C≡N→O, —C≡N→N— or —C=N(→O)— unit, are very particularly suitable.

The grafting of the 1,3-dipolar compound is carried out by [3+2] cycloaddition of the reactive group or groups of the 1,3-dipolar compound to one or more double bonds of a diene elastomer chain. The mechanism of the cycloaddition of a nitrile oxide, a nitrone and a nitrile imine can be illustrated by the following equations, in which the symbol 0 represents any substituent:

Cycloaddition of a nitrile oxide to an unsaturation or double bond of a diene elastomer (in this instance a polyisoprene)

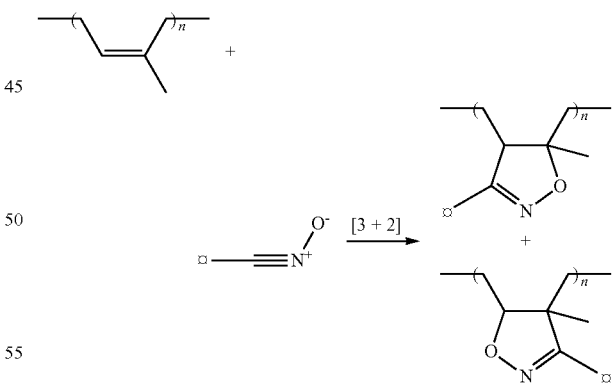

Cycloaddition of a nitrone to an unsaturation or double bond of a diene elastomer (in this instance a polyisoprene)

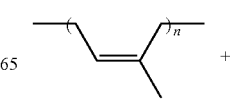

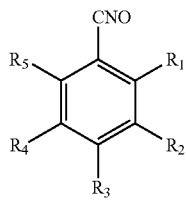

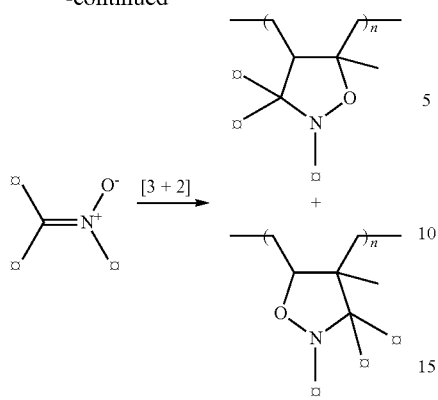

Cycloaddition of a nitrile imine to an unsaturation or double bond of a diene elastomer (in this instance a polyisoprene)

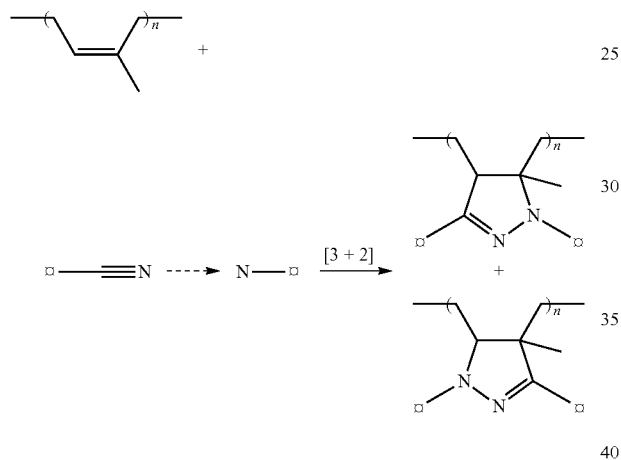

A can be a group containing up to 20 carbon atoms, which group can contain at least one heteroatom. A is preferably an aliphatic group preferably containing from 1 to 20 carbon atoms or an aromatic group preferably containing from 6 to 20 carbon atoms. Preferably, A is an alkylene group preferably containing from 1 to 12 carbon atoms, more preferably from 1 to 6 carbon atoms and more preferably still from 1 to 3 carbon atoms or an arylene group preferably containing from 6 to 20 carbon atoms and more preferably from 6 to 12 carbon atoms. A is advantageously the methylene group.

According to the specific embodiment of the invention where Q comprises a —C≡N→O unit, Q preferably comprises, more preferably represents, the unit corresponding to the formula (III) in which four of the five symbols $R_1$ to $R_5$, which are identical or different, are each an atom or a group of atoms and the fifth symbol denotes a direct attachment to A, it being known that $R_1$ and $R_5$ are both other than H. The four of the five symbols $R_1$ to $R_5$ can be aliphatic or aromatic groups. The aliphatic groups can contain from 1 to 20 carbon atoms, preferably from 1 to 12 carbon atoms, more preferably from 1 to 6 carbon atoms and more preferably still from 1 to 3 carbon atoms. The aromatic groups can contain from 6 to 20 carbon atoms and preferably from 6 to 12 carbon atoms.

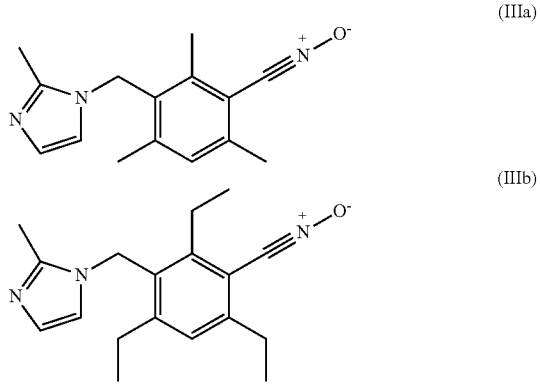

$R_1$, $R_3$ and $R_5$ are preferably each an alkyl group of 1 to 6 carbon atoms, more preferably of 1 to 3 carbon atoms, and more preferably still a methyl or ethyl group.

According to an alternative form of this specific embodiment of the invention, $R_1$, $R_3$ and $R_5$ are identical. According to this alternative form where they are identical, $R_1$, $R_3$ and $R_5$ are preferably each an alkyl group of 1 to 6 carbon atoms, more preferably of 1 to 3 carbon atoms, and more preferably still a methyl or ethyl group.

More preferably, the 1,3-dipolar compound is the compound 2,4,6-trimethyl-3-((2-methyl-1H-imidazol-1-yl)methyl)benzonitrile oxide, corresponding to the formula (IIIa), or the compound 2,4,6-triethyl-3-((2-methyl-1H-imidazol-1-yl)methyl)benzonitrile oxide, corresponding to the formula (IIIb):

According to the specific embodiment of the invention where Q comprises a —C≡N(→O)— unit, Q preferably comprises, more preferably represents, the unit corresponding to the formula (IV) or (V):

in which:
$V_1$ is an aliphatic group, preferably an alkyl group preferably containing from 1 to 12 carbon atoms, or an aromatic group containing from 6 to 20 carbon atoms, preferably an alkylaryl group, more preferably a phenyl or tolyl group,
and $Y_2$, comprising a direct attachment to A, is an aliphatic group, preferably an alkylene group preferably containing from 1 to 12 carbon atoms, or an aromatic group preferably containing from 6 to 20 carbon atoms and comprising, on its benzene nucleus, the direct attachment to A.

The direct attachment of the benzene nucleus of $Y_2$ to A amounts to saying that A is a substituent of the benzene nucleus of $V_2$.

According to this specific embodiment of the invention, the 1,3-dipolar compound is the compound of formula (IVa), (IVb), (Va) or (Vb):

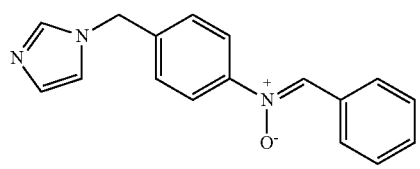
(IVa)

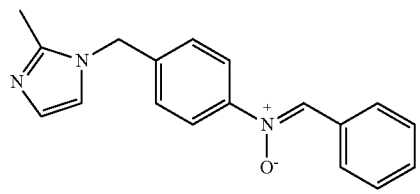
(IVb)

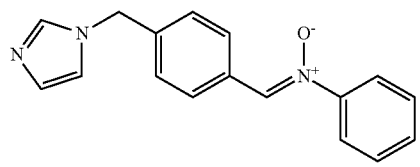
(Va)

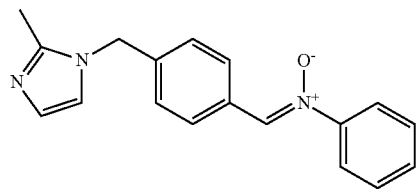
(Vb)

According to any one of the described embodiments of the invention, the diene elastomer preferably comprises between 0 and 3 moles, more preferably between 0 and 2 moles, more preferably still between 0 and 1 mole, indeed even more preferably still between 0 and 0.7 mole, of imidazole rings per 100 moles of monomer units constituting the diene elastomer, it being possible for the imidazole rings to be substituted or unsubstituted. These preferred ranges make it possible to more finely optimize the compromise between the stiffness in the cured state and the hysteresis of the rubber composition according to its application, in particular in a tyre. For each of these preferred ranges, the diene elastomer advantageously comprises at least 0.1 mole of imidazole rings per 100 moles of monomer units constituting the diene elastomer.

The rubber composition in accordance with the invention comprises any type of "reinforcing" filler known for its abilities to reinforce a rubber composition which can be used for the manufacture of tyres, for example an organic filler, such as carbon black, a reinforcing inorganic filler, such as silica, with which is combined, in a known way, a coupling agent, or also a mixture of these two types of filler.

Such a reinforcing filler typically consists of nanoparticles, the (weight-)average size of which is less than a micrometer, generally less than 500 nm, usually between 20 and 200 nm, in particular and more preferably between 20 and 150 nm.

All carbon blacks, in particular the blacks conventionally used in tyres or their treads ("tyre-grade" blacks), are suitable as carbon blacks. Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used.

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface.

Mineral fillers of the siliceous type, preferably silica ($SiO_2$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$, in particular between 60 and 300 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas having a high specific surface as described in Application WO 03/016387.

The physical state under which the reinforcing inorganic filler is provided is not important, whether it is in the form of a powder, microbeads, granules or also beads. Of course, the expression "reinforcing inorganic filler" is also understood to mean mixtures of different reinforcing inorganic fillers, in particular of highly dispersible silicas as described above.

A person skilled in the art will understand that use might be made, as filler equivalent to the reinforcing inorganic filler described in the present section, of a reinforcing filler of another nature, in particular organic nature, such as carbon black, provided that this reinforcing filler is covered with an inorganic layer, such as silica, or else comprises, at its surface, functional sites, in particular hydroxyl sites, requiring the use of a coupling agent in order to establish the bond between the filler and the elastomer. Mention may be made, by way of example, for example, of carbon blacks for tyres, such as described, for example, in patent documents WO 96/37547 and WO 99/28380.

According to a specific embodiment of the invention, the inorganic filler, preferably a silica, represents more than 50% by weight of the weight of the reinforcing filler of the rubber composition. It is then said that the reinforcing inorganic filler is predominant.

When it is combined with a predominant reinforcing inorganic filler, such as silica, the carbon black is preferably used at a content of less than 20 phr, more preferably of less than 10 phr (for example, between 0.5 and 20 phr, in particular between 2 and 10 phr). Within the intervals indicated, the colouring properties (black pigmenting agent) and UV-stabilizing properties of the carbon blacks are benefited from, without, moreover, adversely affecting the typical performances contributed by the reinforcing inorganic filler.

In the present account, the BET specific surface is determined in a known way by gas adsorption using the Brunauer-Emmett-Teller method described in *The Journal of the American Chemical Society*, Vol. 60, page 309, February 1938, more specifically, according to French Standard NF ISO 9277 of December 1996 (multipoint (5 point) volumetric method—gas: nitrogen—degassing: 1 hour at 160° C.—relative pressure p/po range: 0.05 to 0.17). The CTAB specific surface is the external surface determined according to French Standard NF T 45-007 of November 1987 (method B).

Preferably, the content of total reinforcing filler is between 30 and 160 phr, more preferably between 40 phr and 160 phr. Below 30 phr, the reinforcement of the rubber composition is insufficient to contribute an appropriate level of cohesion or wear resistance of the rubber component of the tyre comprising this composition. More preferably still, the content of total reinforcing filler is at least 50 phr. Above 160 phr, there exists a risk of increasing the hysteresis and thus the rolling resistance of the tyres. For this reason, the content of total reinforcing filler is preferably within a range extending from 50 to 120 phr, in particular for use in a tyre tread. Any one of these ranges of content of total reinforcing filler applies to any one of the embodiments of the invention.

In order to couple the reinforcing inorganic filler to the diene elastomer, use is made, in a well-known way, of an at least bifunctional coupling agent, in particular a silane, (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Particularly suitable, without the definition below being limiting, are silane polysulphides corresponding to the general formula (VI):

Z-A-S$_x$-A-Z (VI)

in which:
x is an integer from 2 to 8 (preferably from 2 to 5);
the A symbols, which are identical or different, represent a divalent hydrocarbon radical (preferably a C$_1$-C$_{18}$ alkylene group or a C$_6$-C$_{12}$ arylene group, more particularly a C$_1$-C$_{10}$, in particular C$_1$-C$_4$, alkylene, especially propylene);
the Z symbols, which are identical or different, correspond to one of the three formulae below:

in which:
the R$^1$ radicals, which are substituted or unsubstituted and identical to or different from one another, represent a C$_1$-C$_{18}$ alkyl, C$_5$-C$_{18}$ cycloalkyl or C$_6$-C$_{18}$ aryl group (preferably C$_1$-C$_6$ alkyl, cyclohexyl or phenyl groups, in particular C$_1$-C$_4$ alkyl groups, more particularly methyl and/or ethyl);
the R$^2$ radicals, which are substituted or unsubstituted and identical to or different from one another, represent a C$_1$-C$_{18}$ alkoxyl or C$_5$-C$_{18}$ cycloalkoxyl group (preferably a group chosen from C$_1$-C$_8$ alkoxyls and C$_5$-C$_8$ cycloalkoxyls, more preferably still a group chosen from C$_1$-C$_4$ alkoxyls, in particular methoxyl and ethoxyl).

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis((C$_1$-C$_4$)alkoxyl(C$_1$-C$_4$)alkylsilyl(C$_1$-C$_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula [(C$_2$H$_5$O)$_3$Si(CH$_2$)$_3$S$_2$]$_2$, or bis(3-triethoxysilylpropyl) disulphide, abbreviated to TESPD, of formula [(C$_2$H$_5$O)$_3$Si(CH$_2$)$_3$S]$_2$.

Mention will in particular be made, as coupling agent other than alkoxysilane polysulphide, of bifunctional POSs (polyorganosiloxanes), or else of hydroxysilane polysulphides, such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

Of course, use might also be made of mixtures of the coupling agents described above, as described in particular in the abovementioned Application WO 2006/125534.

The content of coupling agent is advantageously less than 20 phr, it being understood that it is generally desirable to use as little as possible thereof. Typically, the content of coupling agent represents from 0.5% to 15% by weight, with respect to the amount of inorganic filler. Its content is preferably between 0.5 and 12 phr, more preferably within a range extending from 3 to 10 phr. This content is easily adjusted by a person skilled in the art depending on the content of inorganic filler used in the composition.

The rubber composition in accordance with the invention can also comprise, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state.

The rubber composition in accordance with the invention can also comprise all or a portion of the usual additives generally used in the elastomer compositions intended to constitute external mixtures of finished rubber articles, such as tyres, in particular treads, such as, for example, plasticizers or extending oils, whether the latter are aromatic or non-aromatic in nature, in particular very weakly aromatic or non-aromatic oils (e.g., paraffin oils, hydrogenated naphthenic oils, MES oils or TDAE oils), vegetable oils, in particular glycerol esters, such as glycerol trioleates, plasticizing hydrocarbon resins exhibiting a high Tg, preferably of greater than 30° C., such as described, for example, in Applications WO 2005/087859, WO 2006/061064 and WO 2007/017060, pigments, protection agents, such as antiozone waxes, chemical antiozonants or antioxidants, antifatigue agents, reinforcing resins (such as resorcinol or bismaleimide), methylene acceptors (for example phenolic novolak resin) or methylene donors (for example HMT or H3M), such as described, for example, in Application WO 02/10269, a crosslinking system, vulcanization accelerators or retarders, or vulcanization activators. The crosslinking system is preferably based on sulphur but it can also be based on sulphur donors, on peroxide, on bismaleimides or on their mixtures.

The rubber composition in accordance with the invention is manufactured in appropriate mixers, using two successive phases of preparation well known to a person skilled in the art: a first phase of thermomechanical working or kneading ("non-productive" phase) at high temperature, up to a maximum temperature of between 130° C. and 200° C., followed by a second phase of mechanical working ("productive" phase) up to a lower temperature, typically below 110° C., for example between 40° C. and 100° C., during which finishing phase the crosslinking system is incorporated.

The diene elastomer comprising substituted or unsubstituted imidazole rings is generally introduced during the "non-productive" phase in order to be thermomechanically kneaded with the reinforcing filler and optionally the other ingredients, with the exception of the crosslinking system.

According to one embodiment of the invention, the process for preparing the rubber composition based on at least one diene elastomer, a reinforcing filler and a crosslinking system comprises the following stages:

incorporating, in the diene elastomer, during a first "non-productive" stage, the reinforcing filler and, if appropriate, the coupling agent, by kneading thermomechanically until a maximum temperature of between 130° C. and 200° C. is reached, cooling the combined mixture to a temperature of less than 100° C., subsequently incorporating the crosslinking system, kneading everything up to a maximum temperature of less than 120° C., which diene elastomer comprises imidazole rings corresponding to the formula (I) as defined above which are randomly distributed along the chain of the diene elastomer.

According to an alternative form of this embodiment, the process for preparing the rubber composition comprises the following stages:

reacting a 1,3-dipolar compound corresponding to the formula (II) as defined above with a diene elastomer by a bulk or solution grafting reaction, incorporating, in the diene elastomer thus grafted, during a first "non-productive" stage, the reinforcing filler and, if appropriate, the coupling agent, by kneading thermomechanically until a maximum temperature of between 130° C. and 200° C. is reached, cooling the combined mixture to a temperature of less than 100° C., subsequently incorporating the crosslinking system, kneading everything up to a maximum temperature of less than 120° C.

According to this alternative form, the 1,3-dipolar compound corresponds to the formula (IIIa), (IIIb), (IVa), (IVb), (Va) or (Vb) defined above.

The amount of 1,3-dipolar compound used to graft the diene elastomer is expressed as molar equivalent of imidazole ring. For example, if the 1,3-dipolar compound contains just one imidazole ring of formula (I) as defined above, one mole of imidazole ring corresponds to one mole of 1,3-dipolar compound. If the 1,3-dipolar compound contains two imidazole rings of formula (I) as defined above, two moles of imidazole ring correspond to one mole of 1,3-dipolar compound. In the latter case, the use of the 1,3-dipolar compound according to one molar equivalent of imidazole ring corresponds to a half-mole of 1,3-dipolar compound.

In the grafting stage, the 1,3-dipolar compound is added according to an amount preferably of between 0 and 3 molar equivalents, more preferably between 0 and 2 molar equivalents, more preferably still between 0 and 1 molar equivalent, indeed even more preferably still between 0 and 0.7 molar equivalent, of imidazole rings per 100 moles of monomer units constituting the diene elastomer, it being possible for the imidazole rings to be substituted or unsubstituted. For each of these preferred ranges, the lower limit is advantageously at least 0.1 molar equivalent of 1,3-dipolar compound.

The final composition thus obtained is subsequently calendered, for example in the form of a sheet or plaque, in particular for laboratory characterization, or else extruded, in order to form, for example, a rubber profiled element used as rubber component in the preparation of the tyre.

Thus, according to a specific embodiment of the invention, the rubber composition in accordance with the invention, which can either be in the raw state (before crosslinking or vulcanization) or in the cured state (after crosslinking or vulcanization), is in a tyre, in particular in a tyre tread.

Another subject-matter of the invention is a diene elastomer which is defined according to any embodiment described above. The concentration of imidazole rings of this elastomer, which is a subject-matter of the invention, is between 0 and 3 moles per 100 moles of monomer units constituting the diene elastomer.

According to a preferred embodiment, the elastomer, which is a subject-matter of the invention, comprises between 0 and 2 moles, preferably between 0 and 1 mole and more preferably between 0 and 0.7 mole of imidazole rings per 100 moles of monomer units constituting the diene elastomer. For each of these preferred ranges, it advantageously comprises at least 0.1 mole of imidazole rings per 100 moles of monomer units constituting the diene elastomer.

The abovementioned characteristics of the present invention, and also others, will be better understood on reading the following description of several implementational examples of the invention, given by way of illustration and without limitation.

II. IMPLEMENTATIONAL EXAMPLES OF THE INVENTION

II.1-Measurements and Tests Used

NMR Analysis:

The structural analysis and also the determination of the molar purities of the molecules synthesized are carried out by an NMR analysis. The spectra are acquired on a Bruker Avance 3400 MHz spectrometer equipped with a 5 mm BBFO Z-grad "broad band" probe. The quantitative $^1$H NMR experiment uses a simple 30° pulse sequence and a repetition time of 3 seconds between each of the 64 acquisitions. The samples are dissolved in deuterated dimethyl sulphoxide (DMSO). This solvent is also used for the lock signal. Calibration is carried out on the signal of the protons of the deuterated DMSO at 2.44 ppm with respect to a TMS reference at 0 ppm. The $^1$H NMR spectrum coupled with the 2D $^1$H/$^{13}$C HSQC and $^1$H/$^{13}$C HMBC experiments make possible the structural determination of the molecules (cf. tables of assignments). The molar quantifications are carried out from the quantitative 1D $^1$H NMR spectrum.

The determination of the molar content of grafted nitrile oxide compound is carried out by an NMR analysis. The spectra are acquired on a 500 MHz Bruker spectrometer equipped with a "5 mm BBFO Z-grad CryoProbe". The quantitative $^1$H NMR experiment uses a simple 30° pulse sequence and a repetition time of 5 seconds between each acquisition. The samples are dissolved in deuterated chloroform (CDCl$_3$) with the aim of obtaining a lock signal.

2D NMR experiments have made it possible to confirm the nature of the grafted unit by virtue of the chemical shifts of the carbon and proton atoms.

Tensile Tests:

These tensile tests make it possible to determine the elasticity stresses. Unless otherwise indicated, they are carried out in accordance with French Standard NF T 46-002 of September 1988. Processing the tensile recordings also makes it possible to plot the curve of modulus as a function of the elongation. At first elongation, the nominal secant modulus, calculated by reducing to the initial cross section of the test specimen, (or apparent stress, in MPa) is measured at 100% elongation, denoted ASM100.

All these tensile measurements are carried out under the standard temperature conditions (23±2° C.) according to Standard NF T 46-002.

Dynamic Properties:

The dynamic properties tan(δ)max are measured on a viscosity analyser (Metravib VA4000) according to Standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, under standard temperature conditions (23° C.) according to Standard ASTM D 1349-99 or, as the case may be, at a different temperature (100° C.), is recorded. A strain amplitude sweep is carried out from 0.1% to 100% (outward cycle) and then from 100% to 0.1% (return cycle). The results made use of are the complex dynamic shear modulus (G*) at 25% strain, the loss factor tan(δ) and the difference in modulus (ΔG*) between the values at 0.1% and 100% strain (Payne effect). For the return cycle, the maximum value of tan(δ) observed, denoted tan(δ)max, is indicated.

II.2-Synthesis of the 1,3-dipolar compound 2,4,6-trimethyl-3-((2-methyl-1H-imidazol-1-yl)methyl)benzonitrile oxide This compound can be prepared according to the following reaction scheme:

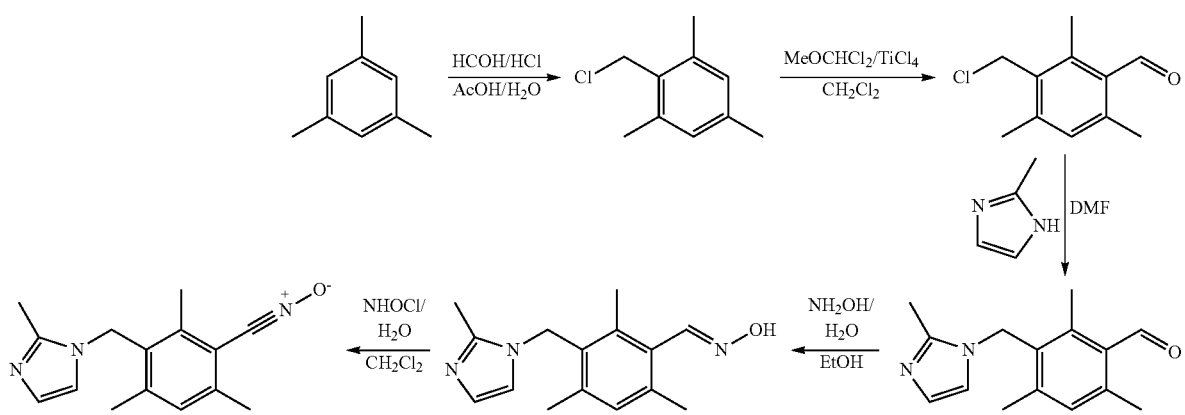

II.2-1-Synthesis of 2-(chloromethyl)-1,3,5-trimethylbenzene

This compound can be obtained according to a procedure described in the following paper: Zenkevich, I. G. and Makarov, A. A., Russian Journal of General Chemistry, Vol. 77, No. 4 (2007), pp. 611-619 (Zhurnal Obshchei Khimii, Vol. 77, No. 4 (2007), pp. 653-662).

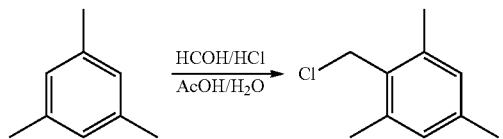

A mixture of mesitylene (100.0 g, 0.832 mol), paraformaldehyde (26.2 g, 0.874 mol) and hydrochloric acid (240 ml, 37%, 2.906 mol) in acetic acid (240 ml) is stirred and heated very slowly (1.5 hours) up to 37° C. After returning to ambient temperature, the mixture is diluted with water (1.0 l) with CH$_2$Cl$_2$ (200 ml) and the product is extracted with CH$_2$Cl$_2$ (4 times with 50 ml). The organic phases are combined, then washed with water (5 times with 100 ml) and evaporated down to 11-12 mbar (temperature of the bath=42° C.). A colourless oil (133.52 g, yield 95%) is obtained. After 15-18 hours at +4° C., the oil crystallized. The crystals are filtered off, washed with petroleum ether cooled to −18° C. (40 ml) and then dried under atmospheric pressure at ambient temperature for 3 to 5 hours. A white solid (95.9 g, yield 68%) with a melting point of 39° C. is obtained. The molar purity is greater than 96% ($^1$H NMR).

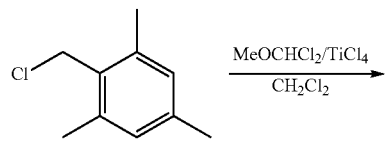

| No. | δ $^1$H (ppm) | δ $^{13}$C (ppm) |
|---|---|---|
| 1/8 | 2.27 | 18.4 |
| 2/7 | — | 136.9 |
| 3/6 | 6.81 | 128.5 |
| 4 | — | 137.4 |
| 5 | 2.15 | 20.3 |
| 9 | — | 130.5 |
| 10 | 4.69 | 41.3 |

II.2-2-Synthesis of 3-(chloromethyl)-2,4,6-trimethylbenzaldehyde

This compound can be obtained according to a procedure described in the following paper: Yakubov, A. P., Tsyganov, D. V., Belen'kii, L. I. and Krayushkin, M. M., Bulletin of the Academy of Sciences of the USSR, Division of Chemical Science (English Translation), Vol. 40, No. 7.2 (1991), pp. 1427-1432 (Izvestiya Akademii Nauk SSSR, Seriya Khimicheskaya; No. 7 (1991), pp. 1609-1615).

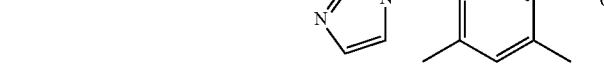

A solution of 2-(chloromethyl)-1,3,5-trimethylbenzene (20.0 g, 0.118 mol) and dichloromethyl methyl ether (27.26 g, 0.237 mol) in dichloromethane (200 ml) is added under argon over 10-12 minutes to a solution of TiCl$_4$ (90.0 g, 0.474 mol) in dichloromethane (200 ml) at 17° C. After stirring at 17-20° C. for 15-20 minutes, water (1000 ml) and ice (500 g) are added to the reaction medium. After stirring for 10-15 minutes, the organic phase is separated. The aqueous phase is extracted with CH$_2$Cl$_2$ (3 times with 75 ml). The combined organic phases are washed with water (4 times with 100 ml) and evaporated under reduced pressure to result in a solid (temperature of the bath=28° C.). The target product (22.74 g) is obtained with a yield of 97%, with a melting point of 58° C. The molar purity, estimated by $^1$H NMR, is 95 mol %.

| No. | δ $^1$H (ppm) | δ $^{13}$C (ppm) |
|---|---|---|
| 1 | 4.77 | 40.6 |
| 2 | — | 132.9 |
| 3 | — | 139.5 |
| 4 | 2.51 | 14.4 |
| 5 | — | 131.4 |
| 6 | 10.43 | 194.2 |
| 7 | — | 140.1 |
| 8 | 2.41 | 19.3 |
| 9 | 6.99 | 131.2 |
| 10 | — | 142.4 |
| 11 | 2.34 | 19.8 |

II.2-3-Synthesis of 2,4,6-trimethyl-3-((2-methyl-1H-imidazol-1-yl)methyl)benzaldehyde

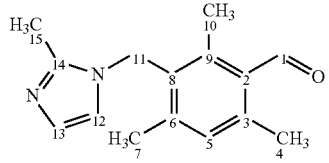

A mixture of 3-(chloromethyl)-2,4,6-trimethylbenzaldehyde (10.0 g, 0.051 mol) and imidazole (10.44 g, 0.127 mol) in DMF (10 ml) is stirred at 80° C. for one hour.

After returning to 40-50° C., the mixture is diluted with water (200 ml) and stirred for 10 minutes. The precipitate obtained is filtered off, washed on the filter with water (4 times with 25 ml) and then dried at ambient temperature. A white solid (7.92 g, yield 64%) with a melting point of 161° C. is obtained. The molar purity is 91% ($^1$H NMR).

| No. | δ $^1$H (ppm) | δ $^{13}$C (ppm) |
|---|---|---|
| 1 | 10.45 | 194.2 |
| 2 | — | 131.5 |
| 3 | — | 139.5 |
| 4 | 2.44 | 19.6 |
| 5 | 7.04 | 131.2 |
| 6 | — | 142.5 |
| 7 | 2.19 | 19.5 |
| 8 | — | 131 |
| 9 | — | 139.5 |

-continued

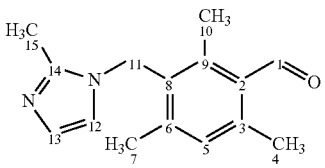

| No. | δ ¹H (ppm) | δ ¹³C (ppm) |
|---|---|---|
| 10 | 2.34 | 14.6 |
| 11 | 5.02 | 42.5 |
| 12 | 6.24 | 116.9 |
| 13 | 6.59 | 125.9 |
| 14 | — | 143.5 |
| 15 | 2.32 | 12.7 |

II.2-4-Synthesis of 2,4,6-trimethyl-3-((2-methyl-1H-imidazol-1-yl)methyl)benzaldehyde oxime

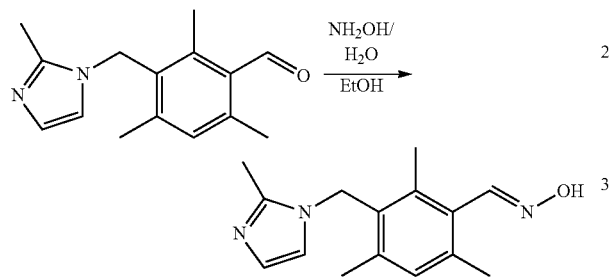

An aqueous hydroxylamine solution (809 g, 0.134 mol, 50% in water, Aldrich) in EtOH (10 ml) is added to a solution of 2,4,6-trimethyl-3-((2-methyl-1H-imidazol-1-yl)methyl)benzaldehyde (20.3 g, 0.084 mol) in EtOH (110 ml) at 40° C. The reaction medium is stirred at a temperature of 50 to 55° C. for 2.5 hours. After returning to 23° C., the precipitate obtained is filtered off, washed twice on the filter with an EtOH/H₂O (10 ml/15 ml) mixture and dried under atmospheric pressure at ambient temperature for 15 to 20 hours. A white solid (19.57 g, yield 91%) with a melting point of 247° C. is obtained. The molar purity is greater than 87% (¹H NMR).

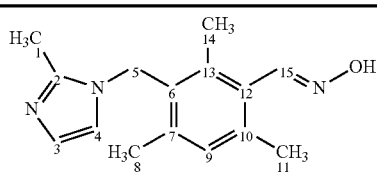

| No. | δ ¹H (ppm) | δ ¹³C (ppm) |
|---|---|---|
| 1 | 2.31 | 12.7 |
| 2 | — | 143.4 |
| 3 | 6.58 | 125.8 |
| 4 | 6.22 | 116.9 |
| 5 | 4.97 | 43.2 |
| 6 | — | 129.3 |
| 7 | — | 136.2 |
| 8 | 2.23 | 20.2 |
| 9 | 6.97 | 130 |
| 10 | — | 137.3 |
| 11 | 2.15 | 19.1 |

-continued

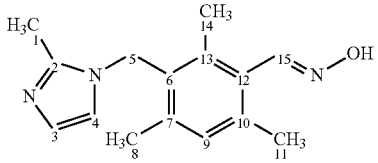

| No. | δ ¹H (ppm) | δ ¹³C (ppm) |
|---|---|---|
| 12 | — | 129.1 |
| 13 | — | 136.1 |
| 14 | 2.11 | 15.9 |
| 15 | 8.25 | 147.4 |
| H | 11.11 | — |

II.2-5-Synthesis of 2,4,6-trimethyl-3-((2-methyl-1H-imidazol-1-yl)methyl)benzonitrile oxide

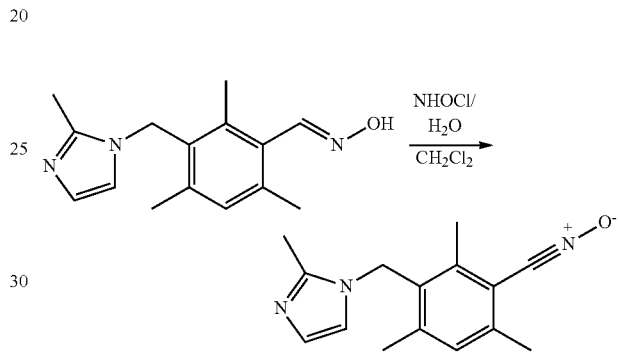

An aqueous solution of NaOCl (4% of active chlorine, Aldrich, 49 ml) is added dropwise over 5 minutes to a mixture of 2,4,6-trimethyl-3-((2-methyl-1H-imidazol-1-yl)methyl)benzaldehyde oxime (8.80 g, 0.034 mol) in CH₂Cl₂ (280 ml) at 6° C. The temperature of the reaction medium is maintained between 6° C. and 8° C. The reaction medium is subsequently stirred at 8° C. to 21° C. for 2 hours. The organic phase is separated. The organic phase is washed with water (3 times with 50 ml). After concentrating under reduced pressure (temperature of the bath=22-23° C., 220 mbar), petroleum ether (10 ml) is added, the solvent is evaporated down to 8-10 ml and the solution is maintained at −18° C. for 10-15 hours, so as to obtain a precipitate. The precipitate is filtered off, washed on the filter with the CH₂Cl₂/petroleum ether (2 ml/6 ml) mixture and then with petroleum ether (2 times 10 ml), and finally dried under atmospheric pressure at ambient temperature for 10-15 hours. A white solid (5.31 g, yield 61%) with a melting point of 139° C. is obtained. The molar purity is greater than 95 mol % (¹H NMR).

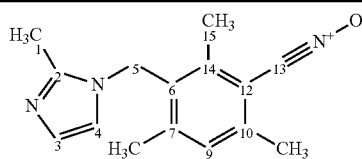

| No. | δ ¹H (ppm) | δ ¹³C (ppm) |
|---|---|---|
| 1 | 2.3 | 12.6 |
| 2 | — | 143.6 |

-continued

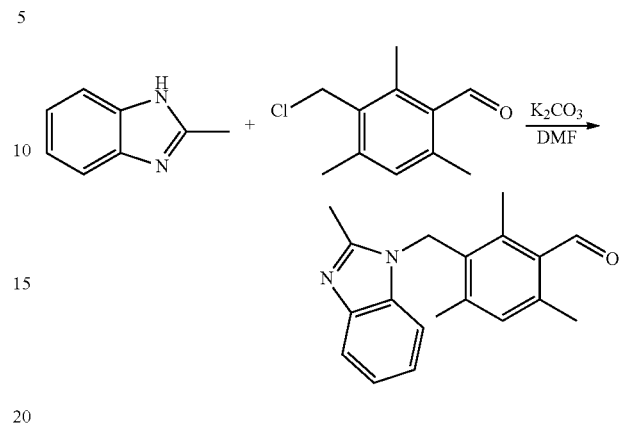

| No. | δ ¹H (ppm) | δ ¹³C (ppm) |
|---|---|---|
| 3 | 6.59 | 126.1 |
| 4 | 6.27 | 117.1 |
| 5 | 4.99 | 43 |
| 6 | — | 130.6 |
| 7 | — | 140.7 |
| 8 | 2.16 | 19.2 |
| 9 | 7.12 | 129.9 |
| 10 | — | 141 |
| 11 | 2.34 | 20 |
| 12 | — | 112.1 |
| 13 | — | NI |
| 14 | — | 140.8 |
| 15 | 2.28 | 17.7 |

II.3-Synthesis of the 1,3-dipolar compound 2,4,6-trimethyl-3-((2-methyl-1H-benzo[d]imidazol-1-yl)methyl)benzonitrile oxide II.3-1-Synthesis of 2-(chloromethyl)-1,3,5-trimethylbenzene The synthesis is identical to that described in section II.2-1.

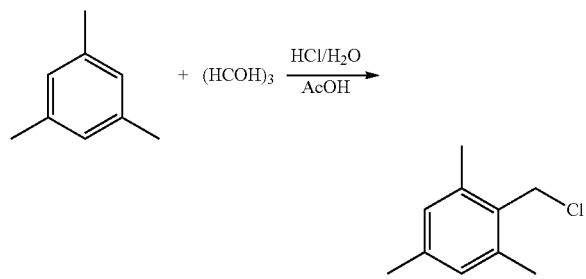

II.3-2-Synthesis of 3-(chloromethyl)-2,4,6-trimethylbenzaldehyde

The synthesis is identical to that described in section 11.2-2.

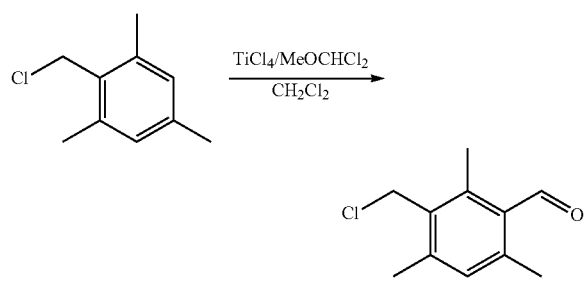

II.3-3-Synthesis of 2,4,6-trimethyl-3-((2-methyl-1H-benzo[d]imidazol-1-yl)methyl)benzaldehyde

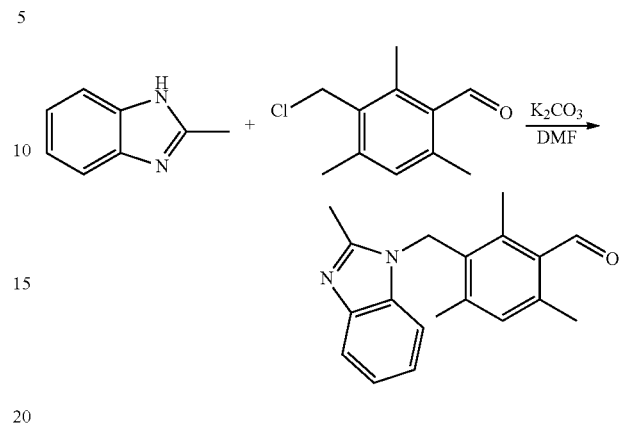

A mixture of aldehyde (11.9 g, 60.5 mmol), 2-methyl-benzimidazole (8.00 g, 60.5 mmol) and potassium carbonate (6.27 g, 45.4 mmol) in DMF (dimethylformamide, 15 ml) is stirred at 80° C. for one hour and at 90° C. for three hours. The mixture is subsequently diluted with water (600 ml). The organic phase is extracted with EtOAc (3 times 150 ml) and washed with water (4 times 75 ml). The solvents are evaporated under reduced pressure (36° C. ($T_{bath}$)) to result in a brown oil. The latter is crystallized from petroleum ether 40/60 (15 ml) and ethyl acetate (20 ml).

A solid (11.70 g, 40.0 mmol, yield 66%) with a melting point of 118° C. is obtained. The molar purity is 70%, EtOAc—5% (¹H NMR).

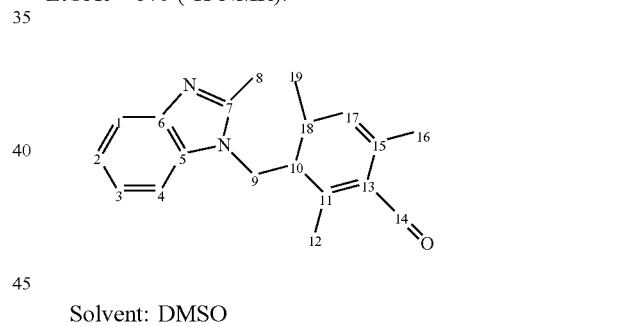

Solvent: DMSO

| No. | δ ¹H (ppm) | δ ¹³C (ppm) |
|---|---|---|
| 1 | 7.45 | 118.0 |
| 2 | 7.01 | 120.5 |
| 3 | 6.93 | 121.2 |
| 4 | 6.79 | 109.6 |
| 5 | / | 134.9 |
| 6 | / | 142.1 |
| 7 | / | 151.8 |
| 8 | 2.38 | 14.1 |
| 9 | 5.42 | 42.6 |
| 10 | / | ~131 |
| 11 | / | 139.4 |
| 12 | 2.28 | 15.1 |
| 13 | / | 131.7 |
| 14 | 10.44 | 194.3 |
| 15 | / | 142.4 |
| 16 | ~2.44 | 19.8 |
| 17 | 7.04 | 131.2 |
| 18 | / | ~141.8 |
| 19 | 2.18 | 20.3 |

II.3-4-Synthesis of 2,4,6-trimethyl-3-((2-methyl-1H-benzo[d]imidazol-1-yl)methyl)benzaldehyde oxime

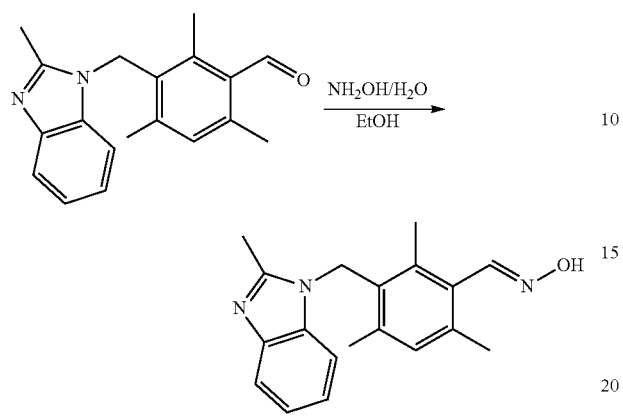

A hydroxylamine solution (6.14 g, 62.9 mmol, 50% in water, Aldrich) in EtOH (20 ml) is added to a solution of aldehyde (11.5 g, 39.4 mmol) in EtOH (80 ml) at 35° C. The reaction medium is stirred at 48-50° C. for 3.5 hours. The reaction medium is subsequently cooled down to 10-15° C. and the precipitate obtained is filtered off, washed on the filter with a mixture of ethanol and water (twice with 5 ml and 10 ml mixture) and then dried under atmospheric pressure at ambient temperature for 15-20 hours.

A solid (7.95 g, 25.9 mmol, yield 66%) with a melting point of 248° C. is obtained. The molar purity is greater than 80% ($^1$H NMR).

| No. | δ $^1$H (ppm) | δ $^{13}$C (ppm) |
|---|---|---|
| 1 | 7.43 | 117.8 |
| 2 | 7.01 | 120.3 |
| 3 | 6.91 | 121 |
| 4 | 6.78 | 109.6 |
| 5 | / | 134.9 |
| 6 | / | 142 |
| 7 | / | 151.7 |
| 8 | 2.37 | 14 |
| 9 | 5.37 | 43.1 |
| 10/11/13/18 | / | between 129.3 and 136.2 |
| 12 | 2.06 | 16.3 |
| 14 | 8.24 | 147.3 |
| 15 | / | 137.1 |
| 16 | 2.23 | 20.3 |
| 17 | 6.96 | 130.1 |
| 19 | 2.12 | 19.6 |

II.3-5-Synthesis of 2,4,6-trimethyl-3-((2-methyl-1H-benzo[d]imidazol-1-yl)methyl)benzonitrile oxide

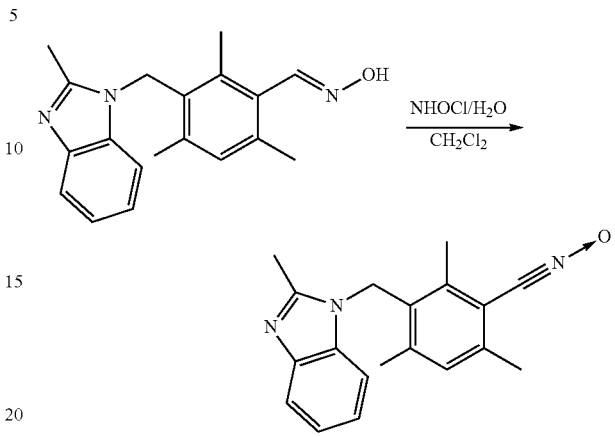

An aqueous solution of NaOCl (6% of active chlorine) (25.4 ml) is added dropwise over 6-8 minutes to a solution of oxime (6.20 g, 20.2 mmol) in dichloromethane (150 ml) cooled down to 5° C. The reaction medium is stirred for 4.5 hours until an emulsion is formed at 10° C. The organic phase is separated and washed with water (3 times with 25 ml). After evaporation of the solvent under reduced pressure ($T_{bath}$ 22-23° C.) until crystallization occurs, petroleum ether (40/60) (10 ml) and dichloromethane (4 ml) are added. The suspension is stirred for 10-15 minutes and the precipitate is filtered off, washed on the filter with the $CH_2Cl_2$/petroleum ether (2 ml/4 ml) mixture and with petroleum ether (40/60) (6 ml), and finally dried under atmospheric pressure at ambient temperature for 10-15 hours.

A white solid (4.85 g, 15.9 mmol, yield 79%) with a melting point of 142° C. is obtained. The molar purity is greater than 71% ($^1$H NMR).

The crude product (4.4 g) is redissolved in acetone (100 ml), this solution is then poured into water (500 ml) and the suspension is stirred for 5-10 minutes. The precipitate is filtered off, washed on the filter with water (200 ml) and dried under atmospheric pressure at ambient temperature for 10-15 hours.

A white solid (3.82 g, 12.6 mmol, yield 62%) with a melting point of 136.5-137.5° C. is obtained with a purity of 94 mol % by $^1$H NMR.

| No. | δ $^1$H (ppm) | δ $^{13}$C (ppm) |
|---|---|---|
| 1 | 7.45 | 118.2 |
| 2 | 7.02 | 120.7 |
| 3 | 6.95 | 121.2 |
| 4 | 6.81 | 109.6 |
| 5 | / | 134.7 |
| 6 | / | 141.9 |
| 7 | / | 151.7 |
| 8 | 2.36 | 13.9 |
| 9 | 5.39 | 42.8 |

-continued

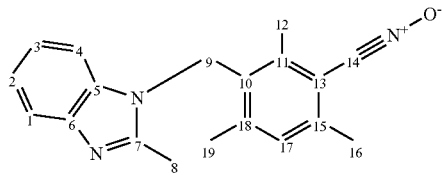

| No. | δ ¹H (ppm) | δ ¹³C (ppm) |
|---|---|---|
| 10 | / | 130.5 |
| 11 | / | between 140.2 and 140.6 |
| 12 | 2.24 | 18.0 |
| 13 | / | 112.3 |
| 14 | / | Undetected |
| 15 | / | 140.9 |
| 16 | 2.34 | 19.9 |
| 17 | / | 130.2 |
| 18 | / | between 140.2 and 140.6 |
| 19 | 2.1 | 19.7 |

Solvent: DMSO

II.4-Preparation of the Grafted Elastomer

Use is made, as grafting agent, of the 1,3-dipolar compound, the synthesis of which is described above in section 11.2 or 11.3.

II.4-1 Preparation of a Grafted SBR (g-SBR)

2,4,6-Trimethyl-3-((2-methyl-1H-imidazol-1-yl)methyl)benzonitrile oxide (0.58 g, 2.26 mmol) is incorporated in 50 g of SBR (containing 25% by weight of styrene and 58% by weight of 1,2-butadiene and with Mn=120 000 g/mol and PI=2) on an open mill (external mixer at 23° C.). 0 5 g of antioxidant N-(1,3-dimethylbutyl)-N'-phenyl-p-phenylenediamine is subsequently incorporated. The mixture is homogenized in 15 turnover passes. This compounding phase is followed by a heat treatment at 120° C. for 10 minutes under a press at a pressure of 10 bar. Analysis by ¹H NMR made it possible to determine a molar degree of grafting of 0.23% and a molar grafting yield of 83%.

The quantification of the functional group is carried out by integrating an Ha or Hb proton of the unit below:

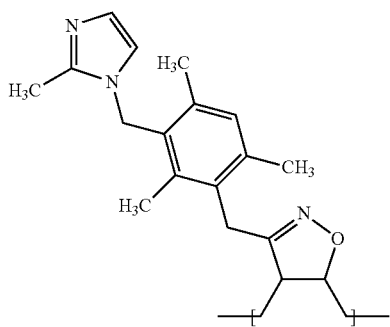

CH (b) located at 6.25 ppm relating to the SBR matrices
CH (a) located at 6.95 ppm relating to the IR matrices

II.4-2 Preparation of a Grafted IR (g-IR)

2,4,6-Trimethyl-3-((2-methyl-1H-imidazol-1-yl)methyl)benzonitrile oxide (0.56 g, 2.18 mmol) is incorporated in 50 g of IR (Natsyn 2200 polyisoprene, ML(1+4) 100° C.=79, 3,4-units=0.5%, trans-1,4-units=1.9%, cis-1,4-units=97.6%, Mw=1044.10³ g/mol, PI=3.6) on an open mill (external mixer at 23° C.). 0 5 g of antioxidant N-(1,3-dimethylbutyl)-N'-phenyl-p-phenylenediamine is subsequently incorporated. The mixture is homogenized in 15 turnover passes. This compounding phase is followed by a heat treatment at 120° C. for 10 minutes under a press at a pressure of 10 bar. Analysis by ¹H NMR made it possible to determine the molar degree of grafting of 0.22% and the molar grafting yield of 73%.

II.4-3 Preparation of a Grafted IR (g-IR2)

Use is made of the 1,3-dipolar compound obtained according to the procedure described in section II.3.

The synthetic polyisoprene (IR2) before modification contains 98% by weight of cis-1,4-units.

The 1,3-dipolar compound is incorporated in a proportion of 1.35 g per 100 g of IR2 on an open mill (external mixer at 30° C.). 1 g of antioxidant N-(1,3-dimethylbutyl)-N'-phenyl-p-phenylenediamine is subsequently incorporated per 100 g of IR. The mixture is homogenized in 12 turnover passes. This compounding phase is followed by a heat treatment at 120° C. for 10 minutes under a press at a pressure of 10 bar.

Analysis by ¹H NMR made it possible to determine a molar degree of grafting of 0.20% and a molar grafting yield of 71%.

A grafted isoprene unit is represented in the figure below:

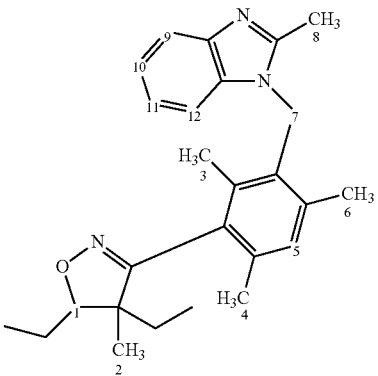

II.5-Preparation of the Rubber Compositions

These compositions are manufactured in the following way: the elastomer, the silica, the coupling agent and also the various other ingredients, with the exception of the vulcanization system, are successively introduced into an internal mixer (final degree of filling: approximately 70% by volume), the initial vessel temperature of which is approximately 110° C. Thermomechanical working (non-productive phase) is then carried out in one stage, which lasts approximately 5 min to 6 min, until a maximum "dropping" temperature of 160° C. is reached. The mixture thus obtained is recovered and cooled and then sulphur and an accelerator of sulphenamide type are incorporated on a mixer (homofinisher) at 23° C., everything being mixed (productive phase) for an appropriate time (for example between 5 and 12 min).

The compositions thus obtained are subsequently calendered, either in the form of plaques (with a thickness ranging from 2 to 3 mm) or thin sheets of rubber, for the measurement of their physical or mechanical properties, or in the form of profiled elements which can be used directly, after cutting and/or assembling to the desired dimensions, for example as semi-finished products for tyres, in particular for treads.

The crosslinking is carried out at 150° C. The crosslinking time applied, t'$_c$(90), is the time necessary for the torque of the composition to reach 90% of the maximum torque of the composition. The torques of the composition are measured at 150° C. with an oscillating disc rheometer, according to Standard DIN 53529—Part 3 (June 1983). t'$_c$(90) is determined according to Standard NF T 43-015 for each of the compositions. It varies approximately from 20 to 40 minutes from one composition to another.

II.5-1 Example 1

The g-SBR and g-IR elastomers are used in the preparation of the rubber compositions g-C1 and g-C2. The SBR and IR elastomers which were used to prepare the grafted g-SBR and g-IR elastomers are used in the unmodified form in order to constitute the elastomer matrix of the control compositions C1 and C2 respectively.

The formulations (in phr) of the compositions C1, g-C1, C2 and g-C2 are described in Table (I). The compositions are identical, apart from the nature of the elastomer, as explained above. The compositions g-C1 and g-C2 are in accordance with the invention. The compositions C1 and C2 are respective control compositions of the compositions g-C1 and g-C2.

TABLE (I)

| | Composition | | | |
|---|---|---|---|---|
| | C1 not in accordance | g-C1 in accordance | C2 not in accordance | g-C2 in accordance |
| SBR (1) | 100 | — | — | — |
| g-SBR (2) | — | 101 | — | — |
| IR (3) | — | — | 100 | — |
| g-IR (4) | — | — | — | 101 |
| Carbon black N234 | 3 | 3 | 3 | 3 |
| Silica (5) | 55 | 55 | 55 | 55 |
| Silane (6) | 5.5 | 5.5 | 5.5 | 5.5 |
| Antioxidant (7) | 1.5 | 1.5 | 1.5 | 1.5 |
| Antioxidant (8) | 1 | — | 1 | — |
| Antiozone wax | 1 | 1 | 1 | 1 |
| ZnO | 2.7 | 2.7 | 2.7 | 2.7 |
| Stearic acid | 2.5 | 2.5 | 2.5 | 2.5 |
| Sulphenamide (9) | 1.8 | 1.8 | 1.8 | 1.8 |
| Sulphur | 1.5 | 1.5 | 1.5 | 1.5 |

(1) SBR: SBR with 25% of styrene units and 56% of 1,2-units of the butadiene part
(2) g-SBR: SBR modified according to the synthesis described above in the preceding section II-4.1
(3) IR: Natsyn 2200 polyisoprene
(4) g-IR: IR modified according to the synthesis described above in the preceding section II-4.2
(5) silica: Zeosil 1165 MP from Rhodia (HDS type)
(6) TESPT (Si69 from Degussa)
(7) 2,2,4-trimethyl-1,2-dihydroquinoline
(8) N-(1,3-dimethylbutyl)-N'-phenyl-p-phenylenediamine from Flexsys
(9) N-cyclohexyl-2-benzothiazolesulphenamide (Santocure CBS from Flexsys)

The results of the characterization tests are recorded in Table (II) below.

TABLE (II)

| Properties in the cured state | Composition | | | |
|---|---|---|---|---|
| | C1 | g-C1 | C2 | g-C2 |
| ASM100 at 23° C. | 2.83 | 3.19 | 2.31 | 3.3 |
| tan(δ)max at 23° C. | 0.28 | 0.17 | 0.21 | 0.04 |
| ΔG* at 23° C. | 4 | 0.67 | 5.36 | 0.21 |
| G* at 100° C. | 1.61 | 1.63 | 1.59 | 1.59 |
| tan(δ)max at 100° C. | 0.13 | 0.08 | 0.12 | 0.04 |

The compositions g-C1 and g-C2 exhibit, at 23° C., a modulus ASM100 at 23° C. which is much greater than that of the respective control compositions C1 and C2. This increase in stiffness in the cured state is obtained although a very significant decrease in the hysteresis at 23° C. is also observed for g-C1 and g-C2, in comparison with their respective controls C1 and C2. The increase in the stiffness in the cured state is all the more remarkable as the fall in hysteresis is very strong, since the value of tan(δ)max at 23° C. decreases by 39% for the SBR matrix and by 80% for the IR matrix and that of ΔG* at 23° C. decreases by 83% for the SBR matrix and by 96% for the IR matrix.

As good road behaviour of a tyre is generally associated with a high stiffness in the cured state of the composition which constitutes its tread, this result foretells good road behaviour of a tyre having a tread comprising a g-C1 or g-C2 composition.

Furthermore, it is observed that the compositions according to the invention g-C1 and g-C2 retain a level of stiffness in the cured state at 100° C. comparable to that of the respective control compositions C1 and C2. These results presage a temperature versatility of the rubber composition in accordance with the invention. This is because it may be expected that a tread containing the composition g-C1 or g-C2 will make it possible for the tyre to have a road behaviour at least just as good as would be had by the control composition C1 or C2, during more extreme rolling conditions, in particular for sports car tyres rolling at high speed.

II.5-1 Example 2

The elastomer g-IR2 is used in the preparation of the rubber composition g-C-IR2. The elastomer IR2 which was used to prepare the grafted elastomer g-IR2 is used in the unmodified form in order to constitute the elastomer matrix of the control composition C-IR2.

The formulations (in phr) of the compositions are described in Table (III). The composition g-C-IR2 is in accordance with the invention. The composition C-IR2 is the control composition of the composition g-C-IR2.

TABLE (III)

| | Composition | |
|---|---|---|
| | C-IR2 not in accordance | g-C-IR2 in accordance |
| IR2 (1) | 100 | — |
| g-IR2 (2) | — | 101 |
| Carbon black N234 | 3 | 3 |
| Silica (3) | 55 | 55 |
| Silane (4) | 5.5 | 5.5 |
| Antioxidant (5) | 1 | — |
| Antioxidant (6) | 1.5 | 1.5 |
| Antiozone wax | 1 | 1 |
| ZnO | 2.7 | 2.7 |
| Stearic acid | 2.5 | 2.5 |

TABLE (III)-continued

| | Composition | |
|---|---|---|
| | C-IR2 not in accordance | g-C-IR2 in accordance |
| Sulphenamide (7) | 2 | 2 |
| Sulphur | 1.3 | 1.3 |

(1) IR2: polyisoprene comprising 98% by weight of cis-1,4-units
(2) g-IR2: IR2 modified according to the synthesis described above in the preceding section II-4.3
(3) silica: Zeosil 1165 MP from Rhodia (HDS type)
(4) TESPT (Si69 from Degussa)
(5) 2,2,4-trimethyl-1,2-dihydroquinoline
(6) N-(1,3-dimethylbutyl)-N'-phenyl-p-phenylenediamine from Flexsys
(7) N-cyclohexyl-2-benzothiazolesulphenamide (Santocure CBS from Flexsys)

The results are recorded in Table (IV) below:

TABLE (IV)

| Properties in the cured state | Composition | |
|---|---|---|
| | C-IR2 | g-C-IR2 |
| ASM100 at 23° C. | 1.84 | 3.72 |
| tan(δ)max at 23° C. | 0.23 | 0.08 |
| ΔG* at 23° C. | 3.27 | 0.59 |
| G* at 100° C. | 1.35 | 1.45 |
| tan(δ)max at 100° C. | 0.13 | 0.06 |

The composition g-C-IR2 exhibits, a 23° C., a modulus ASM100 at 23° C. which is much greater than that of the control composition C-IR2. This increase in stiffness in the cured state is obtained although a very significant decrease in the hysteresis at 23° C. is also observed for g-C-IR2, in comparison with the control C-IR2. The increase in the stiffness in the cured state is all the more remarkable as the fall in hysteresis is very strong.

The invention claimed is:

1. A rubber composition comprising at least one diene elastomer and a reinforcing filler,
wherein the diene elastomer comprises imidazole rings of formula (I) which are randomly distributed along the chain of the diene elastomer:

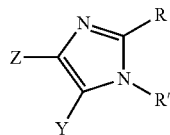  (I)

wherein three of the four symbols Z, Y, R and R', which are identical or different, each represent an atom or a group of atoms, it being possible for Z and Y to form, together with the carbon atoms to which they are attached, a ring, and the fourth symbol Z, Y, R or R' denotes a direct or indirect attachment to the diene elastomer.

2. The rubber composition according to claim 1, wherein R' denotes a direct or indirect attachment to the elastomer.

3. The rubber composition according to claim 2, wherein Z and Y are each a hydrogen atom.

4. The rubber composition according to claim 2, wherein Z and Y form, together with the carbon atoms to which they are attached, a ring.

5. The rubber composition according to claim 1, wherein R represents a hydrogen atom or a carbon-based group which can contain at least one heteroatom.

6. The rubber composition according to claim 5, wherein R is an alkyl group that contains from 1 to 12 carbon atoms.

7. The rubber composition according to claim 1, wherein the imidazole rings are groups grafted to the diene elastomer.

8. The rubber composition according to claim 7, wherein the imidazole rings are groups attached to the diene units of the diene elastomer.

9. The rubber composition according to claim 7, wherein the imidazole rings are grafted to the diene elastomer via groups resulting from grafting a 1,3-dipolar compound to the diene elastomer,
wherein the 1,3-dipolar compound is of formula (II):

Q-A-B   (II), wherein Q comprises a dipole containing at least one nitrogen atom,
wherein A is an atom or a group of atoms connecting Q to B, and
wherein B comprises the imidazole ring of formula (I) in which the fourth symbol denoting an indirect attachment to the diene elastomer denotes a direct attachment to A.

10. The rubber composition according to claim 9, wherein A is an aliphatic group or an aromatic group.

11. The rubber composition according to claim 10, wherein A is an alkylene group or an arylene group.

12. The rubber composition according to claim 9, wherein the 1,3-dipolar compound is selected from the group consisting of nitrile oxides, nitrile imines and nitrones.

13. The rubber composition according to claim 12, wherein Q contains a —C≡N→O unit.

14. The rubber composition according to claim 13, wherein Q comprises a unit of formula (III):

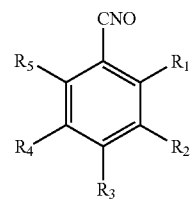  (III)

wherein four of the five symbols $R_1$ to $R_5$, which are identical or different, are each an atom or a group of atoms and the fifth symbol denotes a direct attachment to A, and
wherein neither of $R_1$ and $R_5$ are H.

15. The rubber composition according to claim 14, wherein $R_1$, $R_3$ and $R_5$ are each an alkyl group of 1 to 6 carbon atoms.

16. The rubber composition according to claim 15, wherein the 1,3-dipolar compound is 2,4,6-trimethyl-3-((2-methyl-1H-imidazol-1-yl)methyl)benzonitrile oxide or 2,4,6-triethyl-3-((2-methyl-1H-imidazol-1-yl)methyl)benzonitrile oxide.

17. The rubber composition according to claim 12, wherein Q contains a —C=N(→O)— unit.

18. The rubber composition according to claim 17, wherein Q comprises a unit of formula (IV) or (V):

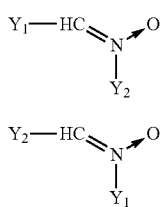

(IV)

(V)

wherein Y₁ is an aliphatic group or an aromatic group containing from 6 to 20 carbon atoms, and wherein Y₂, comprising a direct attachment to A, is an aliphatic group or an aromatic group comprising, on its benzene nucleus, the direct attachment to A.

19. The rubber composition according to claim 18, wherein the 1,3-dipolar compound is a compound of formula (IVa), (IVb), (Va) or (Vb):

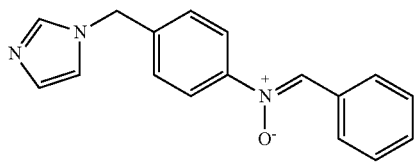

(IVa)

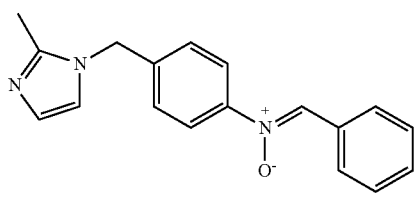

(IVb)

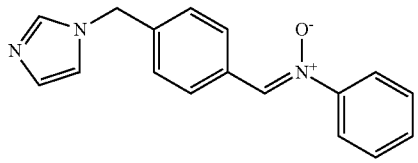

(Va)

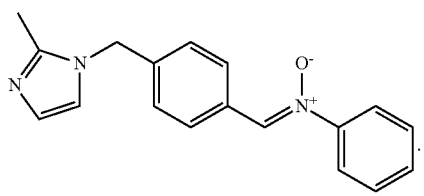

(Vb)

20. The rubber composition according to claim 1, wherein the diene elastomer is an essentially unsaturated elastomer selected from the group consisting of polybutadienes, polyisoprenes, butadiene copolymers, isoprene copolymers and mixtures thereof.

21. The rubber composition according to claim 1, wherein the diene elastomer comprises between 0 and 3 moles of imidazole rings per 100 moles of monomer units constituting the diene elastomer.

22. The rubber composition according to claim 1, wherein the reinforcing filler comprises a reinforcing inorganic filler.

23. The rubber composition according to claim 22, wherein the reinforcing inorganic filler is a silica.

24. The rubber composition according to claim 22, further comprising a silane coupling agent for bonding the reinforcing inorganic filler to the diene elastomer.

25. The rubber composition according to claim 1, further comprising a crosslinking system.

26. A process for preparing a rubber composition according to claim 1, based on at least one diene elastomer, a reinforcing filler and a crosslinking system, the process comprising the steps of:

(a) incorporating, in the diene elastomer, during a first non-productive stage, the reinforcing filler and, if appropriate, the coupling agent, by kneading thermomechanically until a maximum temperature of between 130° C. and 200° C. is reached;

(b) cooling the combined mixture to a temperature of less than 100° C.;

(c) subsequently incorporating the crosslinking system; and (d) kneading up to a maximum temperature of less than 120° C., wherein the diene elastomer comprises imidazole rings of formula (I) which are randomly distributed along the chain of the diene elastomer.

27. The process according to claim 26, wherein step (a) is preceded by a step of reacting a 1,3-dipolar compound with a diene elastomer by a bulk or solution grafting reaction, wherein the 1,3-dipolar compound is of formula (II):

Q-A-B  (II), wherein Q comprises a dipole containing at least one nitrogen atom, wherein A is an atom or a group of atoms connecting Q to B, and wherein B comprises the imidazole ring of formula (I) in which the fourth symbol denoting an indirect attachment to the diene elastomer denotes a direct attachment to A.

28. A tread comprising the rubber composition according to claim 1.

29. A tire comprising the rubber composition according to claim 1.

* * * * *